Figure 1:
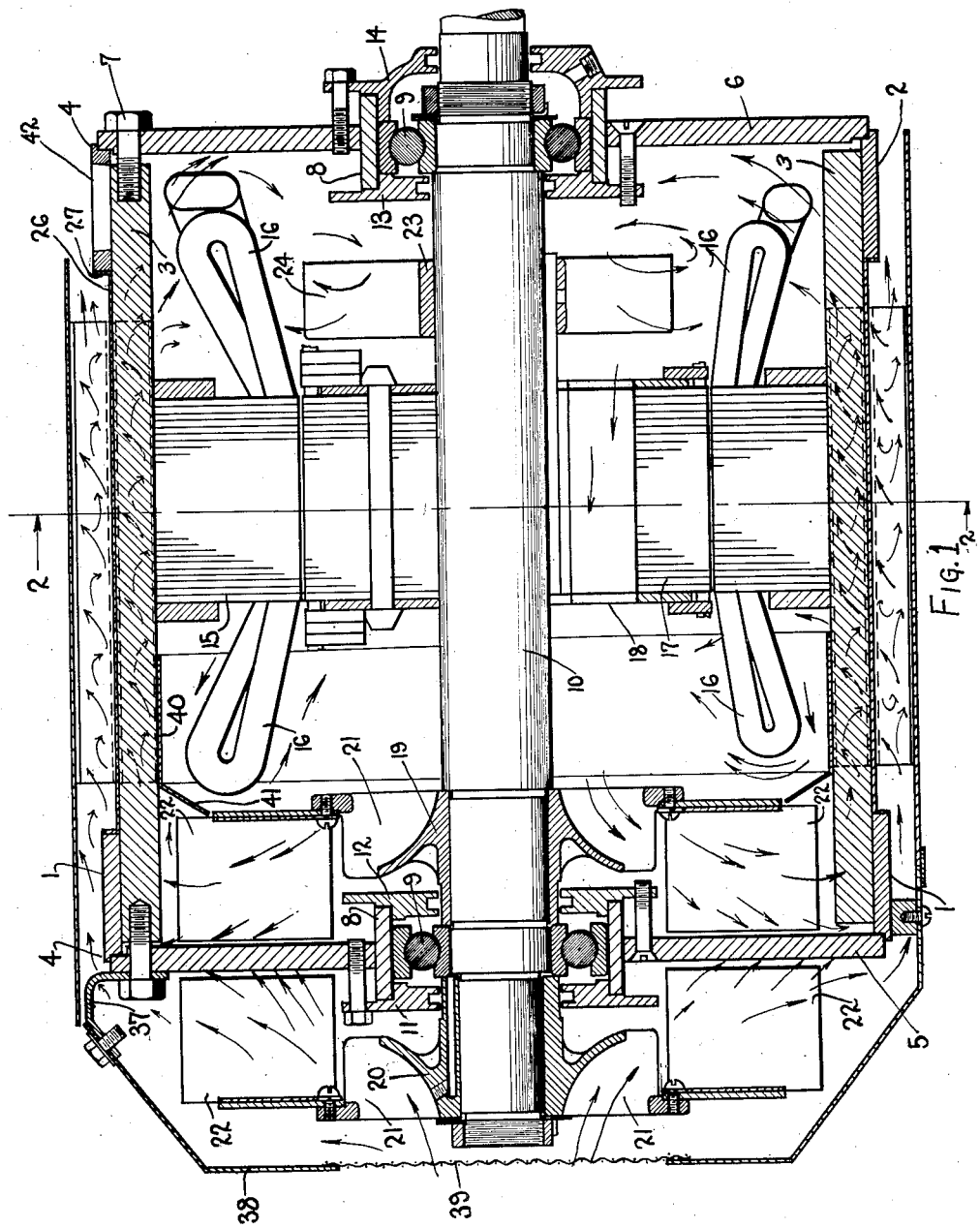

Oct. 25, 1932.  E. CHAPMAN  1,884,573
DYNAMO ELECTRIC MACHINE AND METHOD OF COOLING SAME
Filed July 8, 1930  3 Sheets-Sheet 1

INVENTOR.
Everett Chapman
BY
Fay Oberlin & Fay
ATTORNEYS.

Oct. 25, 1932.   E. CHAPMAN   1,884,573
DYNAMO ELECTRIC MACHINE AND METHOD OF COOLING SAME
Filed July 8, 1930   3 Sheets-Sheet 2

INVENTOR.
Everett Chapman
BY
Fay Oberlin & Fay
ATTORNEYS.

Oct. 25, 1932.  E. CHAPMAN  1,884,573
DYNAMO ELECTRIC MACHINE AND METHOD OF COOLING SAME
Filed July 8, 1930  3 Sheets-Sheet 3
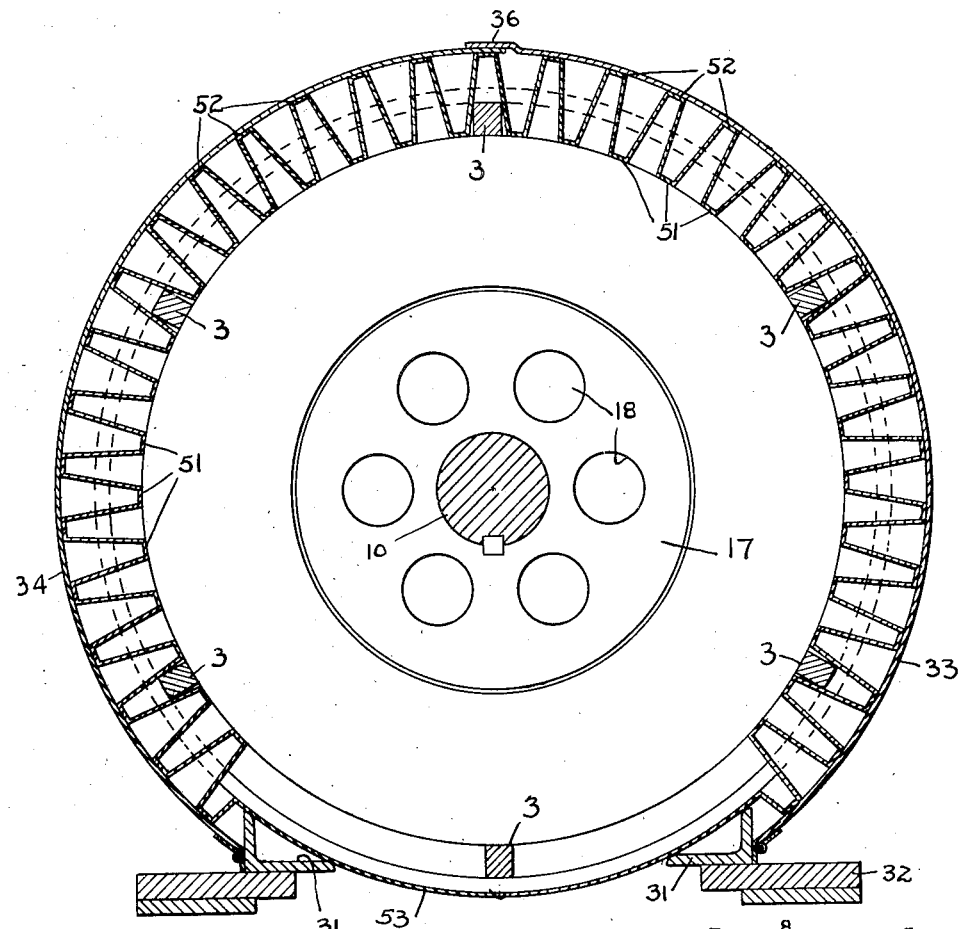
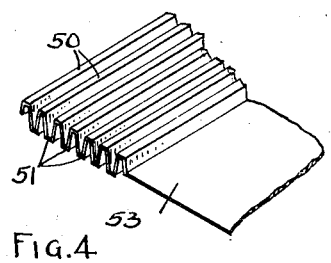
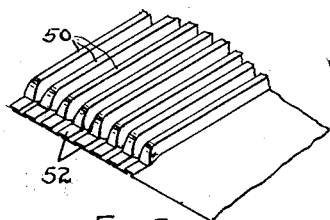
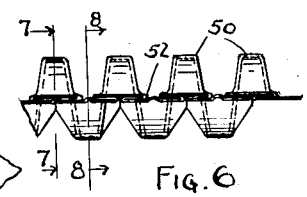
INVENTOR.
Everett Chapman
BY
Fay, Oberlin & Fay
ATTORNEYS.

Patented Oct. 25, 1932

1,884,573

UNITED STATES PATENT OFFICE

EVERETT CHAPMAN, OF COATESVILLE, PENNSYLVANIA, ASSIGNOR TO THE LINCOLN ELECTRIC COMPANY, OF CLEVELAND, OHIO, A CORPORATION OF OHIO

DYNAMO ELECTRIC MACHINE AND METHOD OF COOLING SAME

Application filed July 8, 1930. Serial No. 466,464.

This invention relating, as indicated, to dynamo electric machines and method of cooling same, has specific reference to the construction of a fully enclosed dynamo electric machine which construction is particularly applicable to effect the method of cooling such fully enclosed machine according to the principles comprising my invention. Considerable difficulty has been experienced in the past in the construction of fully enclosed machines due to the fact that such machines, in order to operate within safe limits of temperature, have either been expensive due to the particular methods employed for maintaining the temperature therein within safe working limits or such fully enclosed machines have been exceptionally large as compared to open machines of like horse power rating.

The theory of cooling fully enclosed dynamo electric machines has heretofore been based on the idea that such cooling could be most advantageously effected by setting up within the body of such machines well defined currents of air which were caused to flow through and over the several operating parts in a streamline manner. The laminations in dynamo electric machines which are considered to be one of the chief sources of heat generation have been sought to be cooled by passing thereover currents of air flowing in a streamline manner so that such relatively hotter portions of the machine might be reduced in temperature to the temperature of the air contained within the casing. This has been the theory upon which all cooling of fully enclosed machines has been based and elaborate structures such as radiators, and the like, have been employed to increase the radiating surface of the casing so that the heat generated therein might more efficiently be conveyed to the atmosphere surrounding the machine. The above named methods have been fairly successful where the size of the machine did not prohibit the employment of such supplemental heat dissipating mechanism and when the cost of the manufacture of such machines was not an item seriously considered. In order, however, that fully enclosed dynamo electric machines be supplied to the trade for the various new installations constantly demanding fully enclosed motors, the size of the machine as well as its ultimate cost to the user become items of greater importance. It is among the objects of my invention to provide a construction for fully enclosed dynamo electric machines which shall enable such machines to be built and operate efficiently while being no greater in size than ordinary open machines. Another object of my invention is to provide a method of cooling dynamo electric machines which shall enable such machines to operate within safe temperature ranges under operating conditions and loads heretofore never achieved.

As above indicated all of the methods which have heretofore been employed for the purpose of cooling fully enclosed machines relied upon the principles of setting up within the body of the machine well defined streams of air flowing in a stream-line manner, which air streams were relied upon principally to carry the heat from the hotter parts of the machine to the dissipating surfaces of the casing. The chief imperfection in such methods is that little attention has been paid to the method of conducting the heat generated within the shell of the machine through the areas of low heat conductivity which are made up of the air films blanketing the opposite surfaces of such shell so that it may be absorbed by the atmosphere surrounding such machine which is always of a lower temperature. It is a well known principle of physics that when streams of any fluid, whether liquid or gaseous, flow through a conduit or channel, the velocity of the fluid in the middle of the channel is much greater than in any other portion of the stream body. The velocity of the fluid in the channel through which it flows being at its maximum at the thread or middle of the stream, gradually decreases toward the sides of the channel, so that, when a point adjacent such side is reached, the velocity of the fluid is practically zero. Further, as such fluid flows through the channel, a small film of fluid will adhere to the sides of the channel and will have no appreciable velocity with respect thereto as compared to the velocity of the fluid in the thread or middle of the stream. This condition exists when the stream is permitted to flow in a so-called stream-line manner and when the fluid flows in such manner, a thin film of the fluid will adhere to the sides of the channel and not move relative thereto due to the frictional resistance between such side and such fluid.

It is equally well known in physics that a dead air film is one of the most efficient means for preventing the transmission of heat, inasmuch as air in a state of rest is a good insulator against the passage therethrough of the heat. In setting up within the body of the fully enclosed dynamo electric machine, currents of air which flow in a streamline manner, a film of dead air is permitted to adhere to the inner surface of the casing of such machine offering a barrier for the heat passing from within such machine through the casing thereof to be absorbed by the atmosphere surrounding such machine. Not only does the dead air film on the interior of the machine curtail the heat dissipation thereof, but the dead air film adhering to the outer surface of the casing of the machine acts in a like manner to prevent the passage of the heat through the shell of the machine to be absorbed by the cooler atmosphere. As an illustration of this principle, tests which I have conducted show that the theoretical drop through the shell or casing of a dynamo electric machine should be approximately two degrees, whereas when the streamline flow method of cooling such machines is employed, which consists of setting up within and without the machine currents of air flowing in a streamline manner, the actual temperature difference between the inner and outer atmosphere of the motor is usually approximately 38°. This is conclusive proof that the air film adhering to the inner surface of the machine casing is sufficient for the purpose of causing a difference of approximately 16° in the temperature of the atmosphere within and without the machine and the dead air film on the outer surface of such casing is equally effective to cause a like difference in the temperature of the two bodies of air.

If, however, streamline flow of the cooling fluid is not permitted to occur, but a violent turbulence of the cooling fluid is maintained, the surfaces both interior and exterior of the machine casing can be scrubbed to such an extent that such dead air film is almost entirely broken up and co-mingled with the atmosphere within and without the machine. By breaking down or reducing to a great extent the dead air films next to the inner and outer surfaces of the machine casing, the heat generated within such machine can be more readily transferred through the casing thereof and absorbed by the surrounding atmosphere so that the machine will operate at a much lower temperature than when such air films remain undisturbed. A machine will run considerably cooler if the radiating surfaces thereof are thoroughly scrubbed to destroy the adhering dead air films without circulating through the machine well defined streams of air, than when such well defined streams of air are circulated and the dead air films are permitted to adhere to the radiating surfaces.

A dynamo electric machine constructed in accordance with the principles comprising my invention will operate much cooler than any machine which has heretofore been employed due to the method of cooling thereof which is attained in the manner above described. Various mechanical arrangements and constructions may be resorted to for the purpose of effecting the destruction of the dead air space or film adjacent the radiating surfaces of the machine although the form of construction about to be described has advantages in achieving such result which advantages will become apparent as the description proceeds.

Another disadvantage of the forms of construction of fully enclosed machines which have heretofore been employed is that the radiating means for dissipating the heat generated within the machine soon become clogged and fouled due to the foreign material such as lint, grease, dirt and the like present in the atmosphere in which such machines usually operate. It is among the objects of my invention to provide a construction for a fully enclosed motor which can be readily cleaned with a minimum expenditure of time and labor so that such machine may at all times be kept operating at maximum efficiency and within the safe working temperature limits. Other objects of my invention will appear as the description proceeds. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 2:
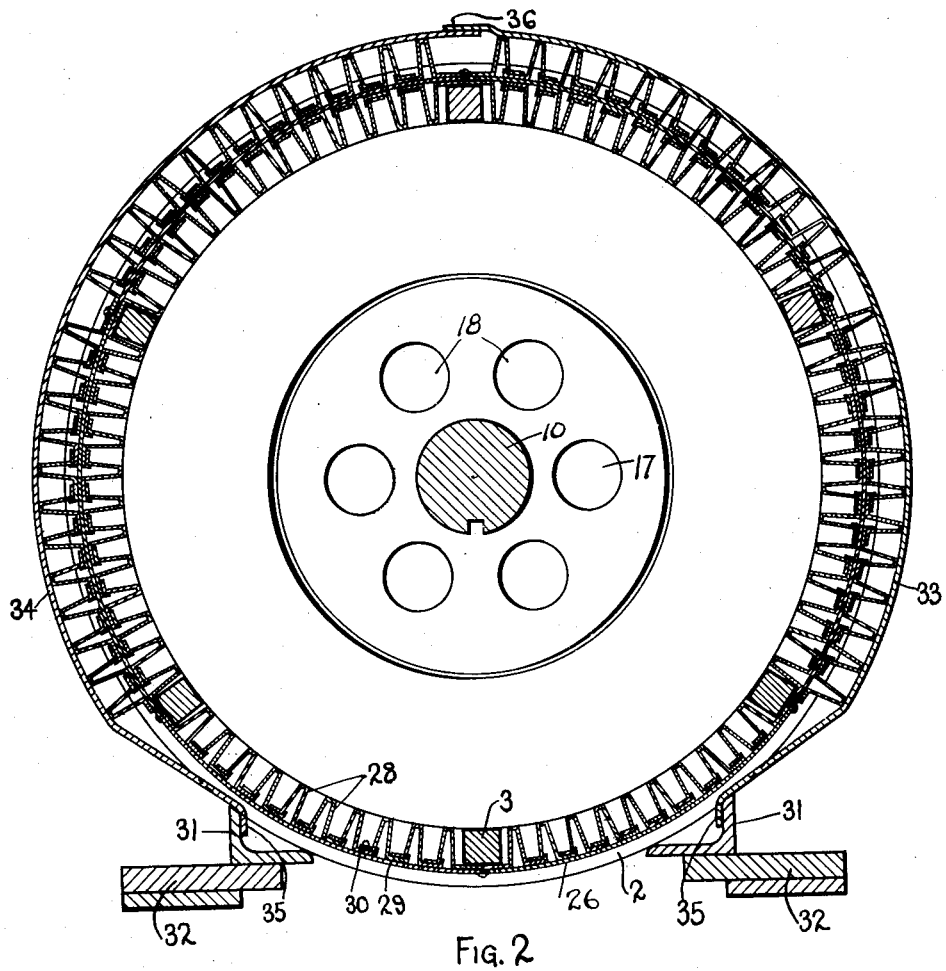
Figure 7:
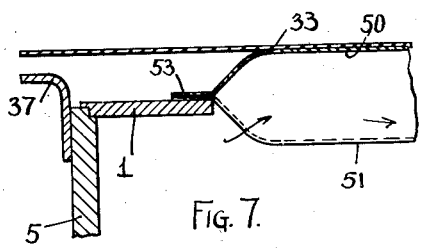
Figure 8:
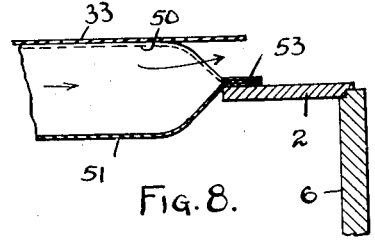

In said annexed drawings:

Fig. 1 is a longitudinal sectional view of a dynamo electric machine constructed in accordance with the principles comprising my invention; Fig. 2 is a transverse sectional view of the machine illustrated in Fig. 1, taken on a plane substantially indicated by the line 2—2; Fig. 3 is a transverse sectional view similar to Fig. 2 showing an alternative form of construction of the air channels forming the casing of the machine; Figs. 4 and 5 are fragmentary isometric views of the shell or casing employed in connection with the structure illustrated in Fig. 3; Fig. 4 showing the structure preliminary to the formation thereof into final form as shown in Fig. 5; Fig. 6 is an end elevational view of the shell as illustrated in Fig. 5; Fig. 7 is a fragmentary sectional view of a portion of the machine showing the casing thereof in section on the plane indicated by the line 7—7 in Fig. 6; and Fig. 8 is a view similar to Fig. 7 showing the shell of the machine in section on a plane substantially indicated by the line 8—8 in Fig. 6.

Referring more specifically to the drawings, the structure illustrated and disclosed in these Figures 1 and 2 consists of axially spaced annular members 1 and 2. These members have secured to their inner peripheries, longitudinally extending frame members or bars 3 as most clearly shown in Fig. 2. The number of bars employed in this construction is six, although it should be noted that any number may be employed for the purpose of producing the proper rigidity and strength of the finished structure. The annular members 1 and 2 have on their opposite ends, formed integrally therewith, annular flanges 4 which, along with the ends of such annular member 1 and 2 serve as seats for disc-like members 5 and 6 which are secured by means of bolts 7 threadedly engaging the ends of the bars 3. In this manner a rigid construction is afforded for the purpose of sustaining the end members 5 and 6 for the purposes hereinafter more fully explained. The end members 5 and 6 are centrally apertured and have secured therein by welding, or the like, cylindrical members 8 which serve as a means of support for bearings 9 in which the rotor shaft 10 is journaled. Caps or gland members, such as 11, 12, 13 and 14 may be employed and secured to the end members 5 and 6 for the purpose of preventing any ingress of air to the interior of the machine during its operation.

The bars 3 serve as a means of support for the stator 15 of the machine which has the usual coils associated therewith, which coils have projecting ends as 16. Mounted on the rotor shaft 10 is the common form of rotor 17 which has a plurality of circumferentially spaced apertures 18 extending axially therethrough for the purpose of permitting a flow of cooling air. It will be noted that the apertures 18 extending axially through the rotor 17 are provided with truly cylindrical walls throughout their entire length, that is the ends thereof are not bell-shaped so that as the air enters such apertures a turbulence thereof will occur as is well known to those familiar with the flow of fluid into and through a conduit.

Secured to the rotor shaft 10 are hubs 19 and 20 which have vanes 21 and fan blades 22 associated therewith and secured thereto. The fan blades 22 are so positioned as to be operable in close proximity to the opposite surfaces of the end member 5 upon rotation of the rotor shaft 10. The rotor shaft 10 has likewise secured thereto at a point on the opposite side of the rotor, a hub 23 which has associated therewith radially extending fan blades 24.

The longitudinally extending bars 3 are encompassed by a sheet metal shell 26 which is tubular in form and has circumferential flanges 27 formed on the terminals thereof for the purpose of securing such shell to the annular members 1 and 2. The tubular member or shell 26 has secured thereto on the inner and outer peripheries thereof channel members 28 which, as most clearly shown in Fig. 2, have complementary legs 29 and 30 respectively adapted to engage the shell 26 and to be telescopically engaged by the complementary leg of the adjacent channel. In the assembly of these channels, one of such channels is secured to the shell by having its leg 29 welded thereto, whereupon the next adjacent channel will be slipped into position by having its leg 29 telescopically engaging the leg 30 of the first-named channel. The superimposed legs 29 and 30 can then be welded to the shell in one operation. It will be noted that in this form of construction of the channels that the channels respectively secured to the inner and outer peripheries of the shell 26 are preferably so arranged that they are in radial alignment resulting in sections of single thickness of the shell 26 for the purpose of advantageously transmitting therethrough the heat generated within such machine.

As most clearly shown in Figs. 3 to 8 inclusive, instead of employing the form of channel construction as is illustrated in Fig. 2, I may prefer to have the shell of the machine formed of a single element which is preferably continuous throughout the periphery of such machine and which is bent into the form of oppositely disposed channels 50 and 51 which when such formed blank is circularized, will respectively be directed outwardly and inwardly with respect to the axis of the machine. After the body of the casing has been channeled or bent as illustrated in Fig. 4, the ends of such channels along the opposite edges thereof are flattened in a suitable press, or the like, as at 52 as most clearly illustrated in Figs. 5 and 6, so that a continuous flat band is formed adapted to be welded or similarly secured to the annular members 1 and 2 as most clearly illustrated in Figs. 6 and 7. When the edge 52 of the corrugated casing is welded to the members 1 and 2, such casing will present longitudinally extending respectively inwardly and outwardly directed channels for the passage therethrough of the air without and within the motor so that the radiating area for the casing of the motor is not only many times increased, but channels are provided for the purpose of conducting the air passing therethrough in such a manner so that a turbulence thereof will result which will effect a washing or scrubbing of the radiating surfaces of such shell both interiorly or exteriorly of the machine.

The corrugated or rebent casing as illustrated in Fig. 3 may have a portion thereof consisting of a plane section as at 53 so that there will be no downwardly projecting channels to interfere with the mounting of the machine on a suitable base.

The body of the machine may be suitably supported by means of longitudinally extending angle members 31 which are welded or otherwise attached to the annular members 1 and 2 at the point of contact between such members and the legs of such angles, which angles may then be supported on suitable leg members 32. The outer periphery of the channels of the machine enclosing shell is encompassed by a removable shell consisting of members 33 and 34 which are at their lower terminals formed as at 35 so as to be removably engaged by the upwardly directed legs of the angles 31 between the annular members 1 and 2, or provided with hinge members adapted to be engaged by the members 1 and 2.

The other terminals of the members 33 and 34 may be removably secured to each other in any well known manner at the seam 36. The cover members 33 and 34 can, therefore, be readily removed from the body of the machine so that a stream of cleaning fluid may be directed against and through the channels on the outer periphery of the machine in order to remove therefrom any dust and dirt which may have accumulated during the operation of the machine.

Secured to the end of the machine by means of brackets or the like as 37 is a hood 38 which is centrally provided with a screen 39 for the admission of the proper amount of air in the proper direction to the fan 20 which will cause such air to be forced through the channels between the outer casing of the machine and the shell thereof. The bars 3 have secured thereto an annular member 40 which has a circumferential flange 41 associated therewith for the purpose of directing the air delivered by the fan 19 to the channels formed on the inner periphery of the shell of the machine. The annular member 2 may have an aperture 42 formed therein for the purpose of admitting the necessary leads required to carry the current to the coils for the operation of the machine.

The operation of the machine may briefly be described as follows. The fan secured to the hub 19, which serves as the main agitating means for the air within the machine in being positioned in close proximity to the inner surface of the end member 5 will, upon rotation due to such close proximity cause a violent agitation of the air adjacent such surface so that the dead air film normally adhering thereto will be broken down due to such scrubbing action. The centrifugal force imparted to the air by the blades 22 of the inner fan 19 causes such air to be projected at a great rate through the channels forming a part of the shell of the machine, which rate of flow will be sufficient to cause a violent turbulation of the air as it sweeps over the inner periphery of such shell thereby breaking up and destroying the dead air film normally adhering thereto. The air in being discharged from the ends of such inner channels will thoroughly wash the ends of the stator coils on the right hand side of the machine and such air, which is permitted to spill through the narrow aperture between the inner edge of the annular member 40 and the stator 15 will sufficiently wash the coil ends 16 protruding from the left side of such stator. The fan secured to the hub 23 causes a violent agitation of the air in the space to the right of the rotor and stator thereby effecting a thorough scrubbing of the end rings and coils in this end of the machine so that such air is caused to absorb a maximum amount of heat before being drawn through the rotor and projected in a scrubbing manner against the inner surface of the end member 5 by the fan 20 which is the most effective area of heat transfer from the interior to the exterior of the machine.

By the arrangement of the fans on the interior of the machine as just described, it will be noted that a violent agitation of the air within such machine is maintained at all times especially adjacent the inner surfaces of the casing of such machine so that such surface, due to the violent agitation is thoroughly scrubbed and the dead air film normally adhering thereto broken down and comingled with the body of the air on the interior of the machine.

The fan blades 22 assisted by the directional effect imparted to the air by the vanes 21, cause such air as admitted through the screen 39 to be projected violently through the channels secured to the outer periphery of the shell 26 at a velocity sufficient to cause a turbulence rather than a streamline flow of the air through such channels, so that here again the air film normally adhering to the surface of such channels and shell is broken up and destroyed.

Other modes of applying the principles of my invention may be employed instead of the one explained, change being made as regards the means and the steps herein disclosed, provided those stated by any of the following claims or their equivalent be employed.

I therefore particularly point out and distinctly claim as my invention:

1. In a dynamo-electric machine, the combination of axially spaced annular members, circumferentially spaced longitudinally extending members secured to said annular members supporting the stator of such machine, a sheet metal casing encompassing said circumferentially spaced members terminally secured to said annular members, channels secured to the inner and outer peripheries of said casing, discs secured to the opposite terminals of said annular members, a shaft carrying the rotor of said machine journaled in said discs, and fans secured to said shaft on opposite sides of one of said discs and operable in close proximity thereto.

2. In a dynamo-electric machine, the combination of axially spaced annular members, circumferentially spaced longitudinally extending members secured to said annular members supporting the stator of such machine, a sheet metal casing encompassing said circumferentially spaced members terminally secured to said annular members, axially extending channels secured to the inner and outer peripheries of said casing, discs secured to the opposite terminals of said annular members, a shaft carrying the rotor of said machine journaled in said discs, and fans secured to said shaft on opposite sides of one of said discs and operable in close proximity thereto.

3. In combination with a dynamo-electric machine, of a casing therefor comprising a sheet metal tubular element, and channels secured to the inner and outer peripheries of said casing, said channels formed of separable units adapted to be welded along one edge to the wall of such casing and telescopically engage the complementary edge of an adjacent channel.

4. In combination with a dynamo-electric machine, of a casing therefor comprising a sheet metal tubular member, and channels secured to the inner and outer peripheries of said casing, said channels having complementary telescopically engaged edges welded to said tubular member.

5. In combination with a dynamo-electric machine, of a casing therefor comprising a sheet metal tubular member, and channels secured to the inner and outer peripheries of said casing, said channels having complementary telescopically engaged edges welded to said tubular member, and said inner and outer channels embracing said tubular member at directly opposite areas.

6. In a fully enclosed dynamo-electric machine, the combination of a supporting frame including end frame members supporting the rotor and circumferentially spaced axially extending bars supporting the stator, and thin corrugated metallic wall members closing the spaces between said bars welded to the periphery of said end frame members.

7. In a fully enclosed dynamo-electric machine the combination of a supporting frame for the rotor and stator respectively comprising closed end frame members and a plurality of spaced axially extending bars, and an air confining shell of thin corrugated metal welded to the periphery of said end frame members.

8. In a fully enclosed dynamo-electric machine, the combination of frame structure supporting the rotor and stator, the peripheral portion of such frame being in skeleton form, and a corrugated metallic air confining member arranged about the periphery of said frame and welded thereto along opposite edges.

9. In a fully enclosed dynamo-electric machine, the combination of a supporting frame structure for rotor and stator, such frame having a skeleton periphery, an air confining shell of thin corrugated metal closing the periphery of said frame and welded thereto, and an annular shell removably secured to the outer periphery of said corrugated shell.

10. In a fully enclosed dynamo-electric machine, the combination of a frame structure supporting the rotor and stator comprising disc-like end members and a skeletonized peripheral frame joining said end frames, a thin corrugated member closing the periphery of said frame, fans mounted on the rotor shaft in such close proximity to opposite faces of said end members as to effect a pneumatic scrubbing of the surfaces thereof, and a confining shell removably secured to the outer periphery of said corrugated closure member.

11. In a fully enclosed dynamo-electric machine, the combination of a skeleton frame structure supporting the rotor and stator, and thin sheet metal air confining means welded to said frame and closing the spaces in said frame.

Signed by me the 3d day of July, 1930.

EVERETT CHAPMAN.